United States Patent
Koczar et al.

(10) Patent No.: US 11,226,003 B2
(45) Date of Patent: Jan. 18, 2022

(54) BEARING ARRANGEMENT

(71) Applicant: Benteler Automobiltechnik GmbH, Paderborn (DE)

(72) Inventors: Peter Koczar, Paderborn (DE); Detlef Meding, Paderborn (DE); Nina Meyer-Smuga, Hoevelhof (DE); Karl-Heinz Mueller, Lippstandt (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 16/881,614

(22) Filed: May 22, 2020

(65) Prior Publication Data
US 2020/0370599 A1  Nov. 26, 2020

(30) Foreign Application Priority Data
May 23, 2019 (DE) .................. 10 2019 113 847.7

(51) Int. Cl.
| F16C 17/10 | (2006.01) |
| F16C 33/08 | (2006.01) |
| F16C 33/20 | (2006.01) |
| F16F 1/38 | (2006.01) |
| F16C 27/06 | (2006.01) |

(52) U.S. Cl.
CPC ............ F16C 33/201 (2013.01); F16C 17/10 (2013.01); F16C 27/063 (2013.01); F16C 33/08 (2013.01); F16C 2240/30 (2013.01); F16C 2380/26 (2013.01); F16F 1/3835 (2013.01)

(58) Field of Classification Search
CPC ........ F16C 17/10; F16C 27/063; F16C 33/08; F16C 33/201; F16C 2226/74; F16C 2240/30; F16C 2326/05; F16C 2326/26; F16C 2380/26; F16C 2230/0029; F16F 1/3835; F16F 1/3842; F16F 1/3863; F16F 1/3876; F16F 2230/0029
USPC ........ 384/275–276, 282, 283, 296, 906, 909, 384/912; 267/292, 64.12
See application file for complete search history.

(56) References Cited

U.S. PATENT DOCUMENTS

| 3,328,101 | A | * | 6/1967 | Sullivan, Jr. .......... F16C 33/201 384/222 |
| 3,928,103 | A | * | 12/1975 | Hipsher ................ F16F 1/3842 156/160 |
| 2020/0018371 | A1 | * | 1/2020 | Durand .................. B62D 7/228 |

FOREIGN PATENT DOCUMENTS

| CN | 107120073 A | * | 9/2017 | ......... E21B 17/1078 |
| CN | 109477536 A | * | 3/2019 | ............ F16F 1/3876 |
| DE | 2358225 A1 | * | 7/1975 | ............... B60G 7/00 |
| DE | 4127092 C1 | | 1/1993 | |

(Continued)

OTHER PUBLICATIONS

Office Action for German Application No. 10 2019 113 847.7 dated Nov. 28, 2019; 6 pp.

(Continued)

*Primary Examiner* — Marcus Charles
(74) *Attorney, Agent, or Firm* — Hauptman Ham, LLP

(57) ABSTRACT

The present disclosure relates to a bearing arrangement having a bearing bush and a rubber/solid bearing which is inserted into the bearing bush with an outer sleeve and an elastomer material which is arranged therein. The bearing bush has inwardly pointing projections, and depressions are configured in the outer sleeve, into which depressions the projections engage.

15 Claims, 3 Drawing Sheets

(56) References Cited

FOREIGN PATENT DOCUMENTS

| DE | 19512986 C1 * | 1/1997 | ............ F16L 33/225 |
|----|---------------|--------|--------------------------|
| DE | 60111522 T2 * | 5/2006 | .......... F16L 37/0982 |
| DE | 102006050463 A1 * | 4/2008 | .............. F16C 33/08 |
| DE | 102007037704 A1 | 2/2009 | |
| DE | 102009034337 A1 | 1/2011 | |
| DE | 102009051159 A1 * | 5/2011 | ............ F16F 1/3842 |
| DE | 102009051159 A1 | 5/2011 | |
| EP | 3006765 A1 * | 4/2016 | ............ F16F 1/3842 |
| FR | 3057310 A1 * | 4/2018 | ............ F16F 1/3842 |
| JP | S60145638 U | 9/1985 | |
| WO | 2011009669 A1 | 1/2011 | |
| WO | WO-2015012966 A1 * | 1/2015 | ............. B60G 7/001 |

OTHER PUBLICATIONS

Decision to Grant for 10 2019 113 847.7 dated Dec. 17, 2019; 10pp.
Office Action for Chinese Application No. 202010417023.8 dated Aug. 4, 2021; 11pp.

* cited by examiner

BEARING ARRANGEMENT

RELATED APPLICATIONS

The present application claims priority to German Application Number 10 2019 113 847.7 filed May 23, 2019, the disclosure of which is hereby incorporated by reference herein in its entirety.

FIELD

The present disclosure relates to a bearing arrangement having a bearing bush and a rubber/solid bearing which is inserted into the bearing bush.

BACKGROUND

The use of the motor vehicle technology of rubber/solid bearings is known from the prior art. Bearing arrangements of this type are used, for example, on chassis components and, specifically here, for the attachment of axle subframes or links of a motor vehicle chassis, but corresponding rubber/solid bearings are also used for the suspension of engines or other peripheral parts of a motor vehicle.

DE 10 2009 051 159 A1 is known from the prior art. Here, a bush for receiving a rubber/solid bearing is configured. There are inwardly directed projections in the bush. A rubber/solid bearing is pressed into the bush. The projections then engage in a positively locking manner into depressions of the rubber/solid bearing, and therefore ensure a fixed bearing seat in the bush.

SUMMARY

It is an object of the present disclosure to improve a generic bearing arrangement with regard to the press-in operation, to achieve a higher service life expectation during operation, and to increase the press-out force.

The aspects of the disclosure which are mentioned above and will be described in the following text can be combined individually or in their entirety with one another as desired, without departing from the disclosure of this disclosure process. Here, the bearing arrangement is arranged on a motor vehicle component or is configured on the latter; for example, on an axle component and on a link. The bearing arrangement can also be arranged on an axle subframe or an engine mount.

To this end, the bearing arrangement has a bearing bush which can also be called a bush. The bearing bush is configured from a tubular body or a tubular piece. A rubber/solid bearing is inserted, or pressed, into the bearing bush. The rubber/solid bearing itself has an outer sleeve and an inner sleeve, an elastomer material being arranged between the outer sleeve and the inner sleeve, which elastomer material is connected, by way of vulcanization to the inner and the outer sleeve.

The bearing bush itself is produced from a hard material and from a metallic material, such as a steel material. The bearing bush is then coupled to the motor vehicle component. The outer sleeve of the rubber/solid bearing is produced from a material which is softer in relation thereto, for example a light metal material and from a plastic material.

In order that a fixed seat of the bearing in the bearing bush is then provided after termination of the press-in operation and increased press-out forces are also required, inwardly directed projections are configured in the bearing bush. Depressions are configured in the outer sleeve in a manner which is complementary with respect to the projections. The depressions are configured set back inward in the radial direction with respect to an outer circumferential face of the outer sleeve. In the case of termination of the press-in operation, the projections engage in a positively locking manner into the depressions, with the result that the rubber/solid bearing is latched in the bearing bush. The rubber/solid bearing is additionally held in the bearing bush by way of a press fit between the outer sleeve and the bearing bush. This ensures an improved seat and increased press-out forces of the rubber/solid bearing in the bearing bush.

Here, the projections themselves can be configured as latching tongues or latching lips. They are arranged at an angle with respect to a parallel of the axial direction of the bearing bush. The projections can be produced by way of a stamping or forming operation. The angle, at which the projections are arranged with respect to a circumferential face of the bearing bush, is from 1 to 30 degrees, from 2 to 20 degrees, and from 3 to 15 degrees.

According to the disclosure, it is then provided in a first design variant of the present disclosure that a plurality of projections are arranged in a radially circumferential manner in the bearing bush, in each case two projections which are adjacent circumferentially in the radial direction being arranged offset with respect to one another in the axial direction. In the axial direction itself, only one projection is always configured, however, on a respective parallel to the axial direction. In each case one adjacent projection is then configured radially offset with respect thereto at least on one side, on the left hand side and on the right hand side. The respective adjacent projection is then consequently configured offset in the axial direction at a different height.

According to the disclosure, this affords the advantage that, unlike in the case of the prior art, in the case of which two projections are configured behind one another in the push-in direction on an axial direction, a first projection engages into a first depression during the push-in operation, is pushed beyond the depression and then engages into a second depression. As a result, it might be the case that this has a negative effect on the positively locking seat of the first depression in the push-in direction, for example by the depression becoming frayed here or parts of the depression breaking off.

According to the disclosure, only one projection passes into a depression in the case of the push-in operation.

Therefore, depressions which are also offset with respect to one another are configured in a complementary manner with respect to the radially and axially offset projections on the outer circumferential face of the outer sleeve. Only one depression is always arranged in the axial direction.

It is a further advantage that unintended deforming of a projection during the passing and exceeding of a first depression is likewise avoided.

A further independent aspect of the disclosure which, however, can also be combined with the aspects which are mentioned above and will be described in the following text provides that the depressions have a length in the axial direction. The projections likewise have a length in the axial direction. The length of the projections, however, is from 0.1 to 0.3 times, from 0.15 to 0.25 times shorter than the length of the depression. If, for example, a projection has a length of 6 mm, the depression can have a length of 7 or else 7.7 mm.

When the rubber/solid bearing has been pushed completely into the bearing bush, the projection engages into the depression in a positively locking manner. Here, a part of the end side of the projection is directly in contact with a part of the depression. The press-out force is increased as a result.

A further advantageous design variant of the present disclosure provides that the depression is not of triangular configuration in its longitudinal section. Rather, the depression has a first bevel in the longitudinal section in the push-in direction, and a second bevel which follows it in the push-in direction. This means that the depression deepens by way of the first bevel from the outer circumferential face in the radial direction toward the inside. By way of the second bevel, the depression in turn passes from the inner radial direction to the outer circumferential face of the outer sleeve. A straight portion can be situated between the two bevels. The straight portion runs parallel to the axial direction of the outer sleeve.

The first depression has an angle of between 20 and 40 degrees, from 25 to 35 degrees, and 30 degrees with respect to a circumferential face of the outer sleeve. An angle of this type makes it possible that, in the case of pushing in, the projection is introduced gently into the depression on account of its springback effect, and therefore does not impact or spring back suddenly or in a spring-like manner into the bottom of the depression.

The second projection in the push-in direction ensures by way of a greater angle relative to the former that a bearing face or end face is provided for an axial end of the projection. The angle of the second bevel is arranged in a range of from 40 to 60 degrees, from 45 to 55 degrees, or approximately 50 degrees. If, therefore, the front-side end of the projection comes into contact with the second bevel, the surfaces and consequently the end faces of the axial end of the projection and the second bevel bear flatly or flush against one another. There is an optimum transmission of force in order to increase the press-out force.

A further aspect of the disclosure provides that the bearing bush is arranged on or in a motor vehicle component. In addition to the fact that the bearing arrangement provides a degree of rotary freedom about the axial direction, a main force direction acts in the radial direction of the bearing arrangement. For example, in the case of a link rod on an axle of a motor vehicle and a bearing arrangement which is arranged on the end side, the axial direction of the bearing arrangement is configured substantially transversely with respect to the longitudinal direction of the link rod. An axial compressive or tensile force which is transmitted via the link rod therefore acts in the longitudinal direction of the link rod, and therefore acts in the radial direction of the bearing arrangement. It has been proven here to be advantageous according to the disclosure if there are no projections and depressions in the bearing arrangement in the main direction of the action of force, with the result that the full surface area between the outer circumferential face of the outer sleeve and the inner circumferential face of the bearing bush is available for the transmission of force. Therefore, no projections and depressions are configured in an angular region of less than plus 45 and less than minus 45 degrees in each case with respect to a main direction of the introduction of force. This is advantageous in the case of compressive forces. No depressions and projections are likewise optionally configured on that side of the main direction of the introduction of force which lies opposite in the radial direction in the bearing arrangement in an angular region of less than plus 45 degrees and less than minus 45 degrees. This is advantageous in the case of tensile forces which act in the longitudinal direction of the link rod.

The number of projections to be used is made dependent on the diameter of the rubber/solid bearing. For example, in the case of an 80 mm diameter, 8 projections, consequently 4 projections per side, can be provided in a circumferentially distributed manner. In the case of a diameter of 100 mm, 10 or more latching lugs can be provided in a circumferentially distributed manner, consequently 5 latching lugs per side. The respective side relates to the explanation with respect to the following FIG. 6.

BRIEF DESCRIPTION OF THE DRAWINGS

Further advantages, features, aspects and properties of the present disclosure are the subject matter of the following description. design variants will be described on the basis of the diagrammatic figures which serve for simple understanding of the disclosure and in which.

In the figures, the same reference numerals are used for identical or similar components, even if a repeated description is dispensed with for reasons of simplicity.

DETAILED DESCRIPTION

Figure 1:
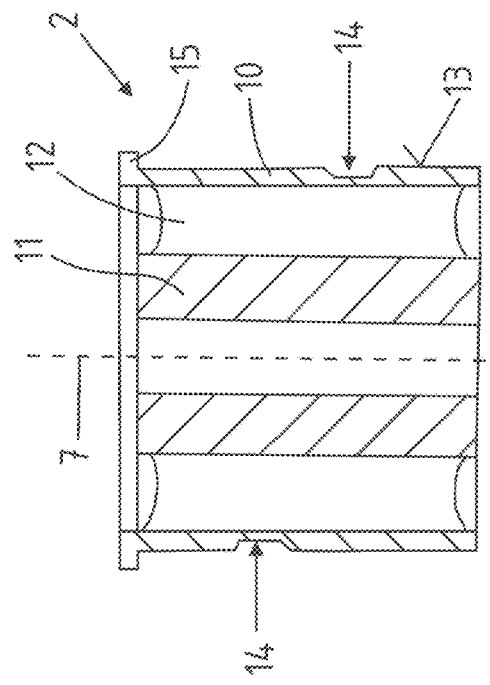
FIG. 1 shows a longitudinal section through a bearing arrangement according to the disclosure.
Figure 2:
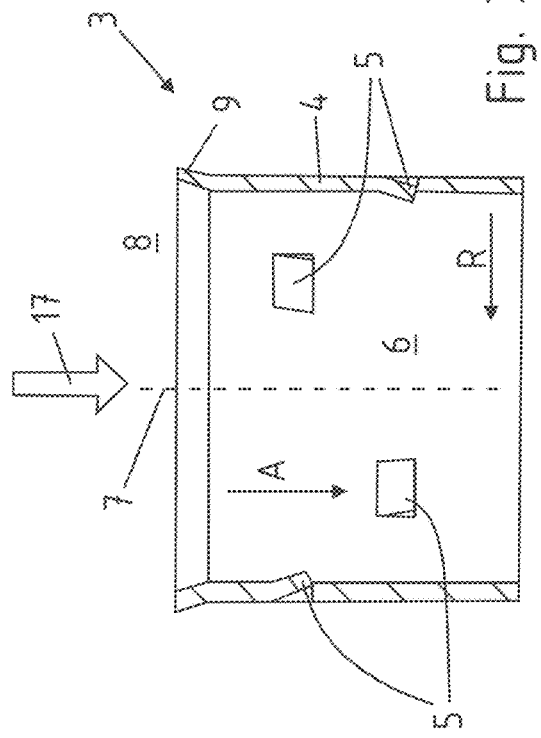
FIG. 2 shows a longitudinal section through a rubber/solid bearing according to the disclosure.
Figure 3:
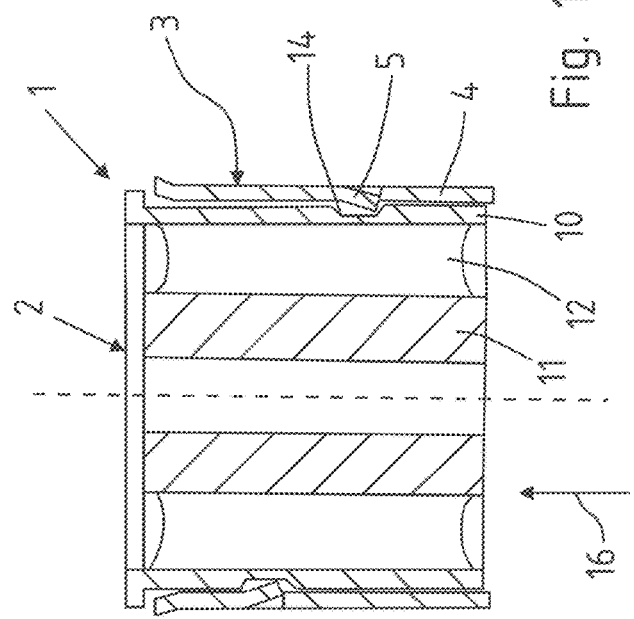
FIG. 3 shows a longitudinal section through a bearing bush according to the disclosure.

FIGS. 1 to 3 show a bearing arrangement 1 according to the disclosure, the bearing arrangement 1 itself being shown in FIG. 1, the rubber/solid bearing 2 being shown in FIG. 2, and the bearing bush 3 being shown in FIG. 3. The rubber/solid bearing 2 which is shown in FIG. 2 is pushed, pressed, into the bearing bush 3 which is shown in FIG. 3, and the bearing arrangement 1 which is shown in FIG. 1 is thus produced as a result. All of the illustrations according to FIGS. 1 to 3 are a longitudinal sectional view.

The bearing bush 3 is configured as a tubular piece or a circumferential tubular body, and has a wall 4. The tubular body is produced as strip material and is then welded or clinched. Projections 5 in the form of latching lips or latching lugs which are oriented into an interior space 6 of the bearing bush 3 are configured in the wall 4.

FIG. 3 shows a first aspect of the disclosure, according to which only one projection 5 is always configured offset in the axial direction A or in a respective parallel to the center longitudinal axis 7. Therefore, two or more projections 5 are never arranged directly behind one another in the axial direction A. All the projections 5 which are shown are therefore offset in a radially circumferential manner with respect to one another, and are in each case likewise offset with respect to one another in the axial direction A. The bearing bush 3 can optionally have a widened portion 9 at an upper end 8. This makes it possible for the rubber/solid bearing 2 to be attached and pressed in simply in the axial direction A.

The rubber/solid bearing 2 which is shown in FIG. 2 has an outer sleeve 10 and an inner sleeve 11 which is arranged in the outer sleeve 10, a respective rubber or elastomer layer 12 being configured in between. Depressions 14 are configured in the outer sleeve 10, in an outer circumferential face 13 of the outer sleeve 10. After ending of the press-in operation, the depressions 14 are configured in a complementary manner with respect to the projections 5, with the result that a respective projection 5 engages into a depression 14 in a positively locking manner. Therefore, the depressions 14 are also arranged offset in a radially circumferential manner with respect to one another. In each case two mutually adjacent depressions 14 are likewise offset in the axial direction A with respect to one another. Only one depression 14 is always arranged in each case in the axial direction A on a parallel to the center longitudinal axis 7. In the case of the rubber/solid bearing 2 being pushed into the bearing bush 3, a projection 5 therefore passes only one depression 14.

There can optionally be an outwardly projecting collar 15 at an upper end of the outer sleeve 10. The collar 15 can configure an abutment or end stop at the end of the press-in operation.

According to FIG. 1, the respective projections 5 then engage into the depressions 14 in a positively locking manner, with the result that the rubber/solid bearing 2 is held in the bearing bush 3 firstly in a frictionally locking manner on account of a press fit. In addition, it is locked in a positively locking manner, with the result that an increased press-out force on account of the positively locking engagement of projections 5 in the depressions 14 is realized, in the press-out direction 16 which is directed counter to the press-in direction 17 which is shown in FIG. 3.

Figure 4:
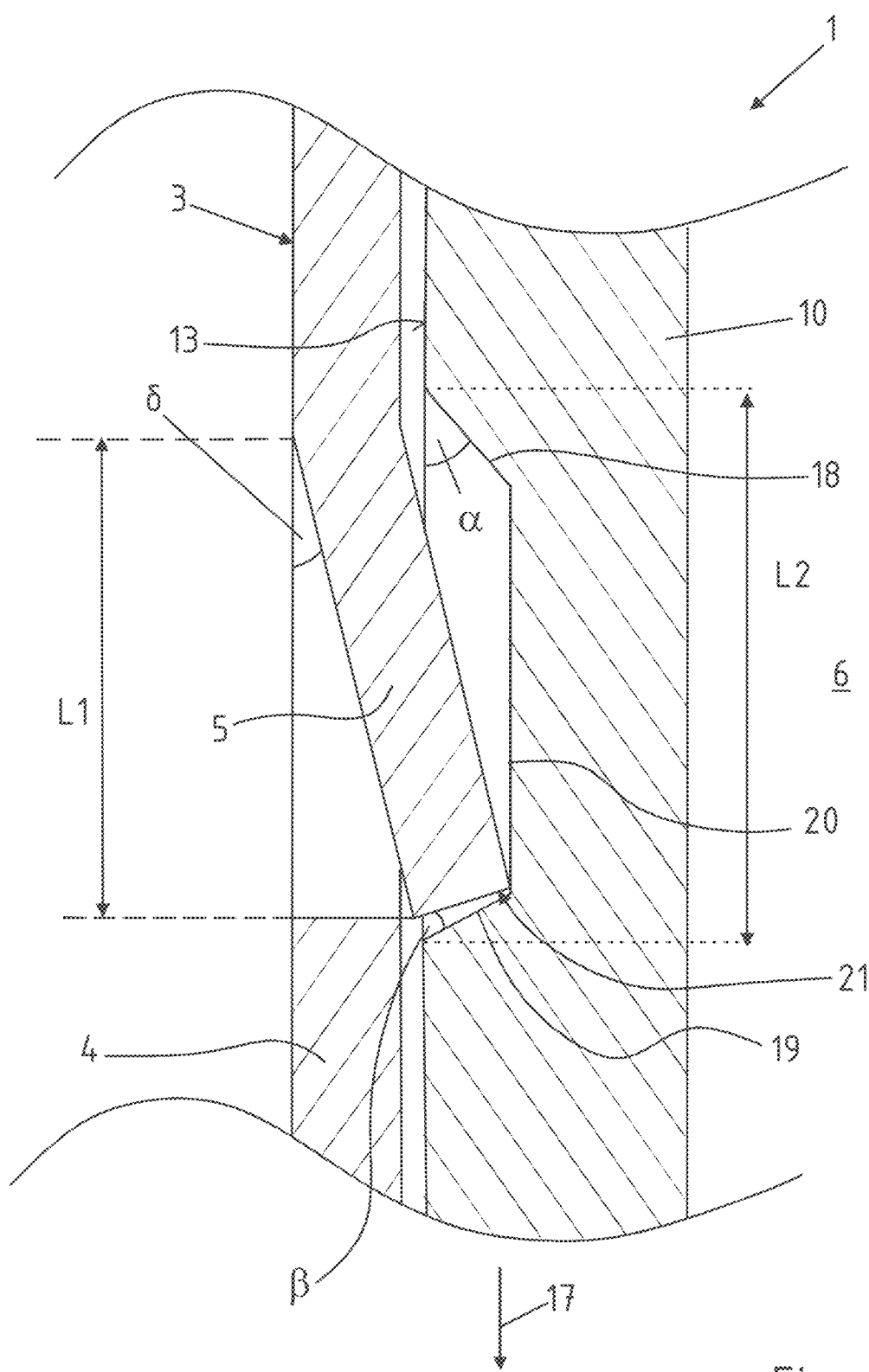
FIG. 4 shows a detailed sectional view of a projection and a depression.

FIG. 4 shows an enlarged detailed view of the bearing arrangement 1, the projection 5 engaging here into a corresponding depression 14. A corresponding projection 5 is inwardly deformed in the direction of an interior space 6 of the bearing bush 3 in the wall 4 of the bearing bush 3 by way of a punching operation, as a latching tongue or latching lip. If the outer sleeve 10 is then pressed in the press-in direction 17, it passes the projection 5. To this end, the projection 5 is configured with an angle δ with respect to the wall 4 of the bearing bush 3 from 1 to 30 degrees in a manner which points in the direction of the interior space 6 as a latching tongue.

A first bevel 18 is provided in the press-in direction, which first bevel 18 is arranged such that it is oriented at an angle α with respect to the outer circumferential face 13. The angle α is from 20 to 40 degrees, from 25 to 55 degrees, and approximately 30 degrees. A second bevel 19 is arranged at an angle β in the press-in direction 17. The angle β is from 40 to 60 degrees, from 40 to 55 degrees, and approximately 50 degrees with respect to the outer circumferential face 13. The two bevels 18, 19 are connected by a straight portion 20. The straight portion 20 extends parallel to the outer circumferential face 13.

It is a further advantage of the disclosure that the length L1 of the projection 5 is from 0.15 to 0.25 times smaller than the length L2 of the depression 14. Therefore, an axial free end 21 of the projection 5 does not come directly into contact with the second bevel 19 in a positively locking manner in the completely pushed-in locked state. Initially, only one corner or one part of the end side of the free end 21 comes into contact in the depression 14 in a positively locking manner. The second bevel 19 and the angle β which is present there ensure that there is not a full-area bearing contact over the entire end side of the free end 21 and the second bevel 19. As a result, the service life is increased further.

Figure 5:
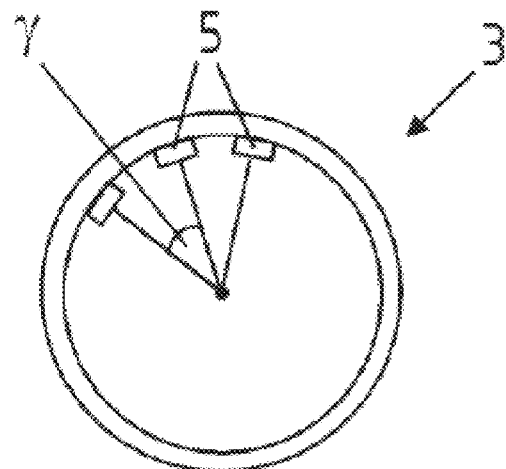
FIG. 5 shows a bearing bush according to the disclosure in plan view.
Figure 6:
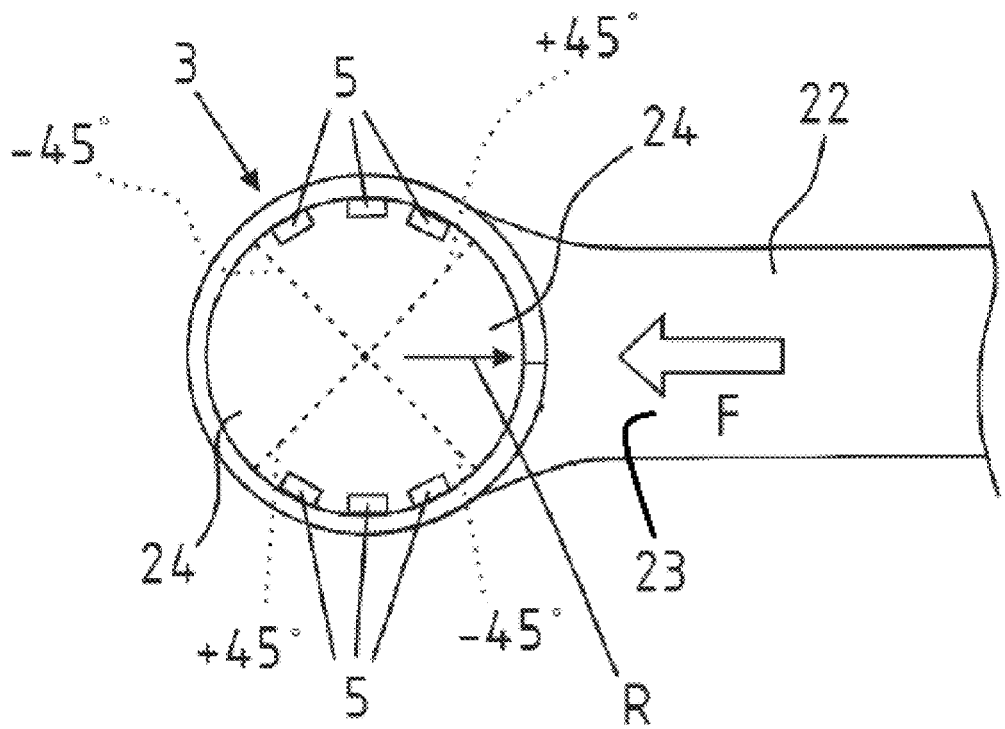
FIG. 6 shows a motor vehicle component with a bearing bush in plan view.

FIG. 5 shows a plan view of a bearing bush 3 according to the disclosure. FIG. 6 shows a plan view of a motor vehicle component 22 with a bearing bush 3. FIG. 5 shows that the projections 5 are arranged offset with respect to one another in a radially circumferential manner at an angle γ of more than 5 degrees, 10 degrees. Three projections 5 are illustrated by way of example. A plurality of projections 5 can be configured in a radially circumferential manner, however, in a completely circumferential manner. In this regard, however, the embodiment according to FIG. 6 will still be taken into consideration.

FIG. 6 shows an end part of a motor vehicle component 22, for example a link rod. Here, a force F can act as a compression force on the bearing bush 3. Here, the force F has a main direction 23, with which it is introduced into the bearing bush 3 in the radial direction R. No projection 5 is then configured in an angular region 24 between plus 45 degrees and minus 45 degrees, between plus 10 degrees and minus 10 degrees. An angular region 24 is likewise configured in the radial direction R on the opposite side, in the case of which angular region 24 no projection 5 is likewise configured from plus 45 degrees to minus 45 degrees, from plus 10 degrees to minus 10 degrees. Therefore, in each case the complete bearing area of the outer sleeve 10 and the bearing sleeve 3 is available in the region of the main direction of action 23 in the radial direction of compressive or tensile forces, which bearing area is not weakened by way of projections 5 or depressions 14. This also has an advantageous effect on the service life.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A bearing arrangement, comprising:
a bearing bush,
a solid bearing having an outer sleeve and an elastomer material arranged in the bearing bush, and
inwardly pointing projections in the bearing bush that engage depressions in the outer sleeve,
wherein each of the projections is arranged offset with respect to another of the projections in an axial direction and in a radial direction, and
wherein each of the depressions is arranged offset with respect to another of the depressions in the axial direction and in the radial direction.

2. The bearing arrangement according to claim 1, wherein each of the projections has a length in the axial direction from 0.1 to 0.3 times shorter than a length of each of the depressions.

3. The bearing arrangement according to claim 1, wherein, in a push-in direction, the depressions have a first bevel arranged at an angle from 20° to 40° with respect to an outer circumferential face of the outer sleeve.

4. The bearing arrangement according to claim 3, wherein each of the projections engages the circumferential face of the bearing bush at an angle (δ) from 1° to 30°.

5. The bearing arrangement according to claim 1, wherein the bearing bush is arranged so that a direction of force is applied in the radial direction of the solid bearing, and no projections and depressions are arranged in an angular region of +45° and −45° with respect to the direction of force, and no depressions and projections are arranged on a side that is opposite to the angular region in the radial direction.

6. The bearing arrangement according to claim 1, wherein the solid bearing has an inner sleeve.

7. The bearing arrangement according to claim 1, wherein the outer sleeve comprises a plastic material.

8. The bearing arrangement according to claim 1, wherein the bearing bush comprises a metallic material.

9. The bearing arrangement according to claim 1, wherein each of the projections is arranged as a latching tongue or a latching lip which is oriented into an interior space of the bearing bush.

10. The bearing arrangement according to claim 1, wherein the bearing bush has a widened portion at one end.

11. The bearing arrangement according to claim 1, wherein the outer sleeve has an outwardly projecting collar at one end.

12. The bearing arrangement according to claim 1, wherein each of the projections has a length in the axial direction from 0.15 to 0.25 times shorter than a length of each of the depressions.

13. The bearing arrangement according to claim 1, wherein, in a push-in direction, each of the depressions has a second bevel arranged at an angle from 40° to 60° with respect to an outer circumferential face of the outer sleeve.

14. The bearing arrangement according to claim 1, wherein the bearing bush is a motor vehicle component.

15. The bearing arrangement according to claim 1, wherein the solid bearing comprises a rubber material.

* * * * *